United States Patent [19]

Balle et al.

[11] 4,172,188

[45] Oct. 23, 1979

[54] DIFUNCTIONAL POLYMERS WITH TERMINAL HYDRAZIDE GROUPS

[75] Inventors: Gerhard Balle, Cologne; Günter Kolb, Leverkusen, both of Fed. Rep. of Germany

[73] Assignee: Bayer Aktiengesellschaft, Fed. Rep. of Germany

[21] Appl. No.: 341,747

[22] Filed: Mar. 15, 1973

Related U.S. Application Data

[63] Continuation-in-part of Ser. No. 315,615, Dec. 15, 1972, abandoned.

[30] Foreign Application Priority Data

Dec. 23, 1971 [DE] Fed. Rep. of Germany ....... 2164313

[51] Int. Cl.² .............................................. C07C 109/06
[52] U.S. Cl. ................................. 525/323; 526/295; 526/338; 526/340; 260/465 D; 260/465.4; 260/558 H; 260/561 H; 525/329; 525/330; 525/334
[58] Field of Search ............. 260/558, 561, 80.7, 260/82.1, 94.6, 80 C, 83.1, 84.7, 85.5, 88.7, 77.5 CH

[56] References Cited

U.S. PATENT DOCUMENTS

| | | | |
|---|---|---|---|
| 2,877,212 | 3/1959 | Seligman | 260/84.7 |
| 3,004,945 | 10/1961 | Farago | 260/77.5 CH |
| 3,030,247 | 4/1962 | Schurb | 260/2 N |
| 3,294,748 | 12/1966 | Rogers et al. | 260/47 EN |
| 3,306,888 | 2/1967 | Mortimer | 260/192 |
| 3,467,707 | 9/1969 | Aelony | 260/2 N |
| 3,511,894 | 5/1970 | Markert | 260/875 |
| 3,717,614 | 2/1973 | Lyssy et al. | 260/77.5 R |
| 3,758,637 | 9/1973 | Cassar | 260/77.5 CH |

FOREIGN PATENT DOCUMENTS

1366467 6/1964 France ................................... 260/94.6

OTHER PUBLICATIONS

French, Rubber Chemistry & Technology, vol. 42, pp. 71-84 (1969).

*Primary Examiner*—John D. Randolph
*Attorney, Agent, or Firm*—Connolly and Hutz

[57] ABSTRACT

Linear telechelic diene polymers with molecular weights of about 300 to about 20,000 which contain hydrazide end groups and to a process for their preparation as well as to their use for synthesizing high molecular weight polymers.

5 Claims, No Drawings

DIFUNCTIONAL POLYMERS WITH TERMINAL HYDRAZIDE GROUPS

This application is a continuation-in-part of Ser. No. 315,615, filed Dec. 15, 1972 and now abandoned.

This invention relates to linear telechelic diene polymers with molecular weights of about 300 to about 20,000 which contain hydrazide end groups and to a process for their preparation as well as to their use for synthesising high molecular weight polymers.

"Telechelic" in this connection describes polymers which are linear and carry the same reactive group at both chain ends.

Polymers with low molecular weights which contain reactive groups are usually liquid and therefore readily react with other components, e.g. by polycondensation or polyaddition, to yield technically interesting segmented ("block"-) polymers. Thus, for example, liquid polybutadienes which contain hydroxyl, carboxyl, or mercapto end groups have been used as active hydrogen components in the isocyanate polyaddition process for producing new rubber-like products.

Processes for producing such telechelic polymers are already known. A survey of the state of development has been given by D. French in "Rubber Chemistry and Technology" 42 (1969) No. 1, pages 71-109. According to that report, telechelic polymers are obtained by anionically or radically initiated polymerisation of monomers or by controlled degradation of high molecular weight polymers (e.g. partial ozonization of polybutadiene). Anionic polymerisation which is carried out with difunctional organolithium catalysts, is difficult to carry out and yields the reactive polymer only after secondary reactions. Moreover, the bifunctionality of the product is not insured since part of the active lithium is lost by side reactions (e.g. with impurities). The methods of degradation are also technically complicated and are not certain to yield bifunctional products. Bifunctional in this context means that each polymer molecule contains two reactive groups.

The initiators and/or regulators used for radical polymerisation contain the reactive groups in their radicals so that they are built into the ends of the polymer chains together with the radical which effects polymerisation. This method therefore leads directly to the telechelic polymer provided chain terminating reactions (chain transfer) which produce inert end groups are prevented. Such reactions include the disproportionation of two growing chains, the transfer of a radical to a polymer molecule (giving rise to branched products) and the transfer of a radical to solvent molecules or impurities. This last mentioned chain terminating reaction can be substantially avoided by using solvents with a low transfer constant (low rate of radical acceptance), e.g. tertiary butanol, and by using very highly purified reactants.

Diene polymers with hydrazide end groups have not previously been described although it is precisely compounds of this kind which would provide numerous possibilities for the synthesis of high molecular weight synthetic resins on account of the very favourable reactivity of the hydrazide group.

This invention relates to linear telechelic diene polymers containing hydrazide end groups and having a molecular weight of from about 300 to about 20,000 in which the polymer chain consists of polymerised units of a conjugated diene or of polymerised units of a conjugated diene and copolymerised units of a copolymerisable ethylenically unsaturated compound and in which the end group have the formula

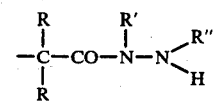

in which R represents an alkyl radical with 1-4 carbon atoms, R' represents a hydrogen atom or an alkyl radical with 1-4 carbon atoms and R" represents hydrogen, an alkyl radical with 1-4 carbon atoms or an optionally substituted phenyl radical.

This invention also relates to a process for the preparation of linear telechelic diene polymers containing hydrazide end groups and having a molecular weight of about 300 to about 20,000 wherein a monomer composition of a conjugated diene and 0 to 50 mol % based on total monomers of an ethylenically unsaturated copolymerisable compound is polymerised in bulk, as an aqueous emulsion or in solution in an inert organic solvent in the presence of 1-20% by weight, based on the monomers, of an initiator of the formula

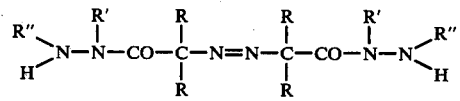

in which R, R' and R" have the meanings already mentioned above, or with a hydrochloride of this initiator.

The following are examples of suitable initiators:

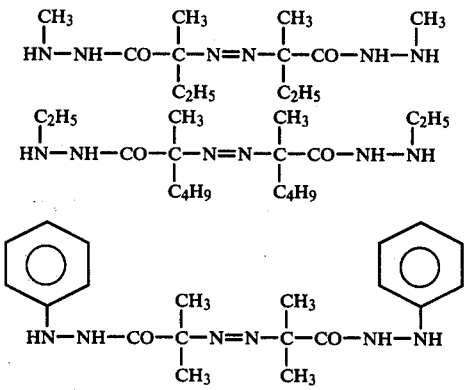

Azo-bis-isobutyric acid hydrazide of the following formula

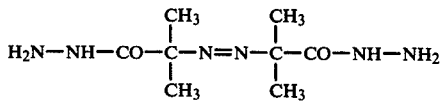

is particularly preferred. This compound is easily obtainable. It decomposes completely at about 170° to 171° C. but at 70° C. its rate of thermal decomposition is already fast enough to start polymerisation. The half life of decomposition of the compound at 120° C. is about 6 hours.

If polymerisation is carried out in aqueous media, e.g. by emulsion polymerisation, the initiators according to the invention may also be used in the form of their hydrochlorides because these are more readily soluble in water and have a lower decomposition temperature. With the hydrochloride of azo-bis-isobutyric acid hydrazide, polymerisation can even be initiated at 35° C. However, the free dihydrazide is generally sufficiently water-soluble. In the case of emulsion polymerisation, the monomers are emulsified with the usual surface active agents, preferably with cationic and/or non-ionic emulsifiers.

The preferred method of carrying out the process of this invention is polymerisation in a homogeneous solution. Inert organic solvents with as low a transfer constant as possible for radical polymerisation(i.e., solvents which do not react with the catalyst nor with the growing polymer radicals) are used for this purpose. Suitable solvents are, for example, aliphatic alcohols containing at least four carbon atoms and aliphatic and aromatic hydrocarbons such as tertiary butanol, benzene or cyclohexane. Solution polymerisation is preferably carried out at 70° to 150° C. at autogenic pressures.

The polymerisation process is basically suitable for any monomers which are monounsaturated or more highly unsaturated and capable of radical polymerisation. The monomers and combinations of monomers for polymerisation according to the invention are, however, selected so that the resulting polymers have molecular weights of 300 to 20,000, preferably 500 to 15,000 and are therefore liquid and pourable. Particularly suitable monomers are 1,3-dienes containing 4 to 6 carbon atoms, e.g. butadiene, isoprene, chloroprene and 2,3-dimethylbutadiene-(1,3). Comonomers may be copolymerised in quantities of up to 50 mole percent, preferably up to about 35 mole %, based on the total quantity of monomers. Particularly suitable are vinyl aromatic compounds such as styrene, vinyl toluene, alkoxy styrenes containing up to 3 carbon atoms in the alkoxy radical, e.g. p-methoxystyrene, halogenated styrenes, e.g. p-chlorostyrene, or α-methylstyrene as well as nitriles and alkyl esters of acrylic and methacrylic acid containing 1 to 6 carbon atoms such as acrylonitrile, methacrylonitrile, ethyl acrylate or methyl methacrylate.

In solution, the polymerisation process of generally carried out by dissolving the initiator in the solvent, adding the monomer or monomers and then starting the polymerisation process by heating. Polymerisation is generally continued until 50 to 80% of the monomers have been polymerised and the polymer is then isolated from the solution by precipitation with a non-solvent, e.g. a lower aliphatic alcohol such as methanol, or by concentrating the solution by evaporation after extraction with water. The molecular weight of the polymer depends on the polymerisation temperature and the quantity of initiator. The polymerisation temperature employed may be in the region of 70° C. to 150° C. Polymerisation is then generally carried out at the pressure which is generated in the sealed vessel. The quantity of initiator used depends on the molecular weight desired and varies from 1 to 20% by weight, preferably 2 to 12% by weight, based on the quantity of monomers.

Emulsion polymerisation is carried out by the usual methods used for such polymerisations, for example by emulsifying the monomer or monomers in water with the aid of a conventional emulsifier and then adding the polymerisation initiator, if desired in the form of its hydrochloride. In this case again polymerisation may be continued to a conversion of 50 to 80%. The polymerisation temperatures employed are about 35° C. to 150° C. The polymer obtained may be precipitated from the emulsion by means of non-solvents which are miscible with water or by means of electrolytes.

To determine the functionality of the product, the equivalent weight is calculated from the nitrogen content and the average molecular weight is determined by an ebullioscopic or osmometric method. The functionality is then calculated from these two values by division. The results indicate that the polymers obtained have an average of two hydrazide end groups per molecule.

Linear telechelic diene polymers which have been obtained from dienes containing 4-6 carbon atoms are particularly preferred. These products have the following general formula

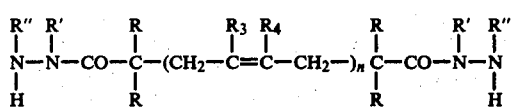

in which R, R' and R" have the meanings already indicated, $R_3$ and $R_4$ independently represent hydrogen, methyl or chlorine and n is an integer of 1 to about 370, preferably 1 to 300.

Other preferred polymers according to the invention are obtained by the copolymerisation of a conjugated diene containing 4-6 carbon atoms with styrene and acrylonitrile. They may be represented by the following general formula

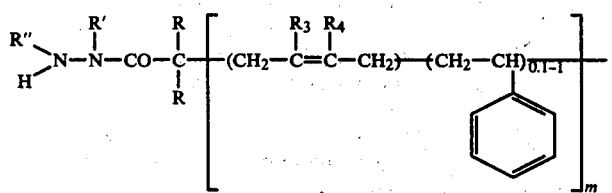

or the general formula

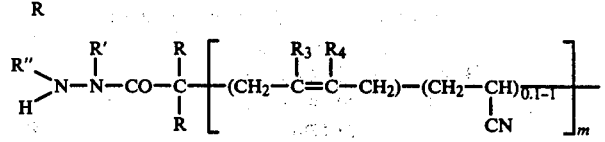

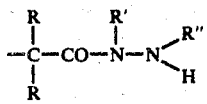

In this formula, the general radicals have the meanings already indicated and m is an integer of 1 to about 250. The expression in square brackets is intended to indicate that the two monomer units may be distributed in any way.

Alternatively these polymers may be represented as

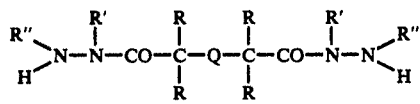

wherein R' and R" are defined as above and Q represents a polymer chain made up to structure units $Q_1$ and $Q_2$ at a molar ratio of $Q_1:Q_2=10:1$ to $1:1$ and with any distribution of $Q_1$ and $Q_2$ within the chain. $Q_1$ represents

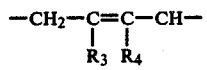

($R_3$ and $R_4$ as above) and $Q_2$ represents

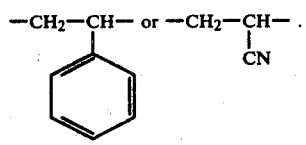

The number of connected radicals $Q_1$ and $Q_2$ is 2 to about 370, preferably 2 to 300.

Several processes are suitable for synthesizing high molecular weight polymers from low molecular weight, liquid bifunctional polymers, among which the isocyanate polyaddition process is particularly versatile and simple. Polymers with hydrazide end groups are particularly suitable for this method on account of their high reactivity with isocyanates. The carboxylic acid hydrazide group in particular reacts so readily with isocyanates that bifunctional polymers which contain this end group are very suitable for the synthesis of high molecular weight polysemicarbazides by a casting process (reaction casting) or a spray process wherein the monomers are mixed and polymerisation occurs subsequently with shaping. Alternatively, these high polymer substances may, of course, also be produced first and then processed by the usual methods employed in the rubber and plastics industry such as rolling, pressing etc. Due to the incorporation of polymer segments which cannot be attacked hydrolytically and of semicarbazide groups which form very stable hydrogen bridge bonds with each other, these high polymers exhibit superior resistance to hydrolysis, very good heat resistance and age resistance and excellent mechanical properties. Cross-linking can be achieved by incorporating more than difunctional polyisocyanates, e.g. trifunctional, or by means of the usual vulcanisation systems used for rubber processing. The new polymers may, of course, also be used in combination with other starting materials with functional end groups commonly used in polyurethane chemistry such as polyether or polyester polyols for synthesizing mixed segment copolymers which also have increased resistance to hydrolysis.

In particular, the linear telechelic diene polymers with hydrazide end groups according to this invention may be reacted with any of the usual diisocyanates, e.g. aliphatic or aromatic diisocyanates. The following are particularly suitable: Tolylene diisocyanates (including isomeric mixtures thereof), hexamethylene diisocyanate, diphenyl methane-4,4'-diisocyanate, 4,4'-diisocyanatodiphenylether and naphthylene-1,5-diisocyanate. So called NCO prepolymers, i.e., reaction products of diisocyanate or polyisocyanates with polyethers or polyester polyols which contain free NCO groups are also suitable. The diene polymers which contain hydrazide end groups and the diisocyanates are generally reacted together at an NH:NCO ratio of 0.8 to 1.5.

The linear telechelic diene polymers after reaction with diisocyanates constitute cross-linked rubber-like elastomeric products which have widely varying degrees of elasticity and widely varying other properties depending on the polyisocyanate or NCO-prepolymer used. They are generally suitable for making shaped articles including fibres and offer the advantage that the properties of the material can be adjusted to the purpose under consideration very easily and within wide limits.

Other possibilities of converting polymeric dihydrazides into high molecular weight products include e.g. the reaction with bifunctional low molecular weight or high molecular weight epoxy resins as well as the polycondensation with dicarboxylic acids and their derivatives, for example dicarboxylic acid esters, anhydrides or halides or with aliphatic hydrocarbons substituted with two or more halogens. The polyaddition reaction with epoxy resins yields elastic resins with good electric properties which may be used as moulding and casting compositions.

Particularly important in this connection is the reaction of diene polymers according to the invention with diepoxides. Polyepoxides based on bisphenols, e.g. bisphenol A, or on aromatic amines are particularly suitable for this purpose. They are obtained by reacting amines such as aniline, 4,4'-monomethylaminophenylmethane or the bisphenols with epichlorohydrin. Polyglycidyl esters based on aromatic or hydroaromatic polycarboxylic acids and cycloaliphatic polyepoxides which may be obtained by reacting monoolefinically unsaturated compounds with e.g. peracetic acid are also suitable.

The epoxi cross-linked materials could be classified as high impact polyepoxide resins. These products are also suitable for making shaped articles. They show lower elasticity but have very pronounced impact resistance.

EXAMPLES 1-4

Polymerisation of butadiene

General Method: 400 g of tertiary butanol and the required quantity of initiator are introduced into a 3-liter stirred autoclave, the air in the apparatus is completely displaced with pure nitrogen, and 800 g of butadiene are then pumped in. The reaction mixture is then heated to the polymerisation temperature and polymerised to a conversion of about 50 to 60%. After cooling, the pressure is released and the polymer is precipitated with methanol or the solution is taken up in benzene, extracted with water and evaporated in a thin layer evaporator.

| Example | 1 | 2 | 3 | 4 |
|---|---|---|---|---|
| % by weight of azo-bis-isobutyric acid hydrazine based on monomer | 4 | 8 | 12 | 5 |
| Polymerisation temperature °C. | 140 | 100 | 120 | 140 |
| Polymerisation time (hours) | 15 | 15 | 15 | 15 |
| [η]measured in toluene,25° C. | 0.24 | 0.20 | 0.19 | 0.38 |
| Osmometric molecular weight (average) | 2650 | 3950 | 2600 | 2800 |
| % nitrogen | 2.05 | 1.41 | 2.2 | 2.05 |
| Equivalent weight calculated from N | 1368 | 1985 | 1273 | 1368 |
| Functionality (number of reactive groups per molecule) | 1.94 | 1.99 | 2.04 | 2.05 |

The polymer from Example 4 was fractionated to demonstrate the uniform incorporation of the hydrazide end groups. Molecular weight and nitrogen content were determined on two of the fractions.

| | Fraction A | Fraction B |
|---|---|---|
| Osmometric molecular weight | 4600 | 1750 |
| [η] toluene at 25° C. | 0.2 | 0.09 |
| % nitrogen | 1.3 | 3.3 |
| functionality | 2.14 | 2.06 |

EXAMPLE 4(a)

To a 10% by weight solution of the polymer from Example 4 in toluene there is added the equivalent quantity of 4,4'-diphenylmethane diisocyanate dissolved in toluene. The viscosity of the solution rises sharply after a short time. The reaction proceeds exothermically without the addition of activator. After 24 hours the solution is still homogeneous and can easily be poured and diluted and dried on glass plates to form very elastic, tear-resistant films.

EXAMPLE 4(b)

100 g of the polymer from Example 4 are vigorously mixed with the equivalent quantity of an epoxy resin (diglycidyl ether of bisphenol A, epoxide equivalent 370). The mixture is poured into a glass dish and heated to 110° C. for 2 hours. It is then reheated at 80° C. for 10 hours. After breaking the dish, a pale yellow disc of a clear, very tough and elastic resin is left behind.

EXAMPLE 5

30 g of the sodium salt of a sulphonated mixture of $C_{12}$–$C_{18}$ alkanes and 60 g of azo-bis-isobutyric acid hydrazide are dissolved in 2500 ml of water in a 6-liter stirred autoclave. The air in the apparatus is displaced by repeated evacuation and filling up with nitrogen. 1500 g of butadiene are then emulsified in the solution. The mixture is heated to 90° C. and the progress of polymerisation is followed by determining the solids content of samples. The experiment is stopped when the conversion is 65% of the theroetical. The polymer is precipitated by pouring the emulsion into 5 l of methanol. The resulting oil is washed once with water and once with methanol and then freed from solvent residues in a thin layer evaporator. A pale brown resin which is pourable is obtained. The average figure obtained from osmometric molecular weight determinations is 3240, the nitrogen content is 1.8%. The equivalent weight is therefore calculated to be 1545 and the functionality 2.1.

EXAMPLES 6–7

The following reaction mixtures are polymerised by the method described in Examples 1 to 4:

| Example | 6 | 7 |
|---|---|---|
| tert.-butanol | 400 | 400 |
| Azo-bis-isobutyric acid hydrazine | 40 | 40 |
| Butadiene | 640 | 640 |
| Styrene | 160 | — |
| Acrylonitrile | — | 160 |
| Composition of the polymer determined by gas chromatographic analysis of residual monomer | 18% styrene 82% butadiene | 31% acrylontrile 69% butadiene |
| Nitrogen content | 2.51% | 9.58% |
| Molecular weight (average figure) | 2210 | 3240 |
| Equivalent weight | 1116 | — |
| Functionality | 1.98 | — |

In Example 7, accurate determination of the equivalent weight by determining the nitrogen content is not possible. Taking into account the acrylonitrile content which was determined by another method, the residual nitrogen content from the end groups is found to be about 1.4%. The equivalent weight is calculated from this result to be 2000 and the functionality 1.87. A reaction with the equivalent quantity of 4,4'-diphenylmethane diisocyanate as in Example 4a shows that the functionality is not >2. A reaction solution is obtained which is readily pourable and free from gel.

We claim:
1. A linear telechelic diene polymer having hydrazide terminal groups and a molecular weight of about 300–20,000, the polymer chain thereof consisting of a homopolymer of a non-cyclic conjugated 1,3-diene having 4 to 6 carbon atoms or a copolymer of a non-cyclic conjugated diene having 4 to 6 carbon atoms and an ethylenically unsaturated compound selected from the group consisting of styrene, vinyl toluene, alkoxy styrene having up to 3 carbon atoms in the alkoxy moiety, halogenated styrene, nitriles of acrylic and methacrylic acid and alkyl esters of acrylic and methacrylic acid having from 1 to 6 carbon atoms in the alkyl moiety, said copolymer containing said ethylenically unsaturated compound in an amount of up to 50 mol % and the terminal groups of said linear telechelic diene polymer being of the formula

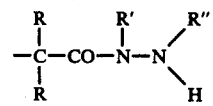

where R is alkyl having 1 to 4 carbon atoms, R' is hydrogen or alkyl having 1 to 4 carbon atoms and R" is hydrogen, alkyl having 1 to 4 carbon atoms or phenyl.

2. A linear telechelic diene polymer of claim 1 having the formula

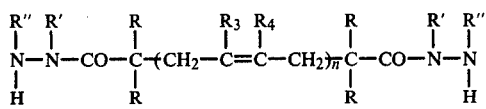

wherein R is alkyl having 1 to 4 carbon atoms, R' is hydrogen or alkyl having 1 to 4 carbon atoms, R'' is hydrogen, alkyl having 1 to 4 carbon atoms or a phenyl radical, $R_3$ and $R_4$ independently are hydrogen, methyl or chlorine and n is a number from 1 to 370.

3. A linear telechelic diene polymer of claim 1 having the formula

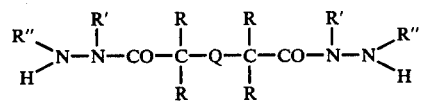

wherein R is alkyl having 1 to 4 carbon atoms, R' is hydrogen or alkyl having 1 to 4 carbon atoms, R'' is hydrogen or alkyl having 1 to 4 carbon atoms, Q is a polymer chain made up of radicals $Q_1$ and $Q_2$ with a molar ratio of $Q_1:Q_2$ of 10:1 to 1:1 with any distribution of $Q_1$ and $Q_2$ within the polymer chain, $Q_1$ being

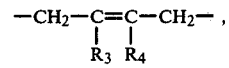

$Q_2$ being

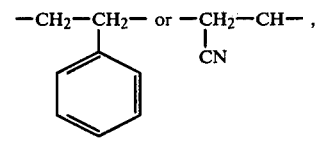

the number of connected radicals $Q_1$ and $Q_2$ being from 2 to about 370 and $R_3$ and $R_4$ independently are hydrogen, methyl or chlorine.

4. A linear telechelic diene polymer of claim 1 having the formula

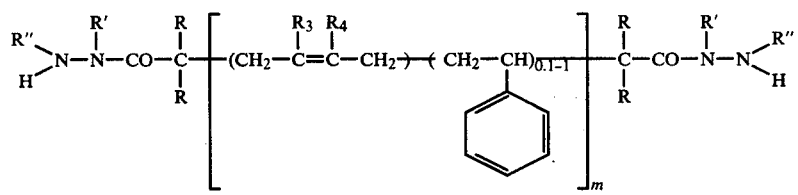

wherein R is alkyl having 1 to 4 carbon atoms, R' is hydrogen or alkyl having 1 to 4 carbon atoms, R' is hydrogen or alkyl having 1 to 4 carbon atoms, R'' is hydrogen of alkyl having 1 to 4 carbon atoms, $R_3$ and $R_4$ independently are hydrogen, methyl or chlorine, m is an integer of from 1 to 250 and wherein the monomer units within the square brackets may have any distribution.

5. A linear telechelic diene polymer of claim 1 wherein said non-cyclic conjugated 1,3-diene is selected from the group consisting of butadiene, isoprene, chloroprene, and 2,3-dimethyl-butadiene-(1,3).

* * * * *